United States Patent
Yoshida et al.

(10) Patent No.: US 9,042,060 B2
(45) Date of Patent: May 26, 2015

(54) MAGNETIC HEAD HAVING A LONG THROAT HEIGHT PINNED LAYER WITH A SHORT HEIGHT HARD BIAS LAYER

(71) Applicant: HGST Netherlands B.V., Amsterdam (NL)

(72) Inventors: Nobuo Yoshida, Hiratsuka (JP); Hideki Mashima, Odawara (JP); Norihiro Iwata, Odawara (JP); Takahiro Ibusuki, Tokyo (JP)

(73) Assignee: HGST Netherlands B.V., Amsterdam (NL)

( * ) Notice: Subject to any disclaimer, the term of this patent is extended or adjusted under 35 U.S.C. 154(b) by 56 days.

(21) Appl. No.: 14/037,254

(22) Filed: Sep. 25, 2013

(65) Prior Publication Data
US 2015/0085395 A1     Mar. 26, 2015

(51) Int. Cl.
*G11B 5/39*     (2006.01)

(52) U.S. Cl.
CPC .................................. *G11B 5/3932* (2013.01)

(58) Field of Classification Search
USPC .................................................. 360/324.12
See application file for complete search history.

(56) References Cited

U.S. PATENT DOCUMENTS

| | | | |
|---|---|---|---|
| 7,360,298 B2 | 4/2008 | Gill | |
| 7,978,441 B2 | 7/2011 | Lin et al. | |
| 8,125,746 B2 | 2/2012 | Dimitrov et al. | |
| 8,184,409 B2 | 5/2012 | Xue et al. | |
| 8,223,462 B2 * | 7/2012 | Gill et al. | 360/319 |
| 8,472,146 B2 * | 6/2013 | Brown et al. | 360/319 |
| 2004/0120082 A1 | 6/2004 | Ikegami et al. | |
| 2010/0258887 A1 | 10/2010 | Zhu et al. | |
| 2012/0069474 A1 | 3/2012 | Takagishi et al. | |

OTHER PUBLICATIONS

Shimazawa et al., "Enhanced GMR Ratio of Dual Spin Valve With Monolayer Pinned Structure," 2006 IEEE, IEEE Transactions on Magnetics, vol. 42, No. 2, Feb. 2006, pp. 120-125.

* cited by examiner

*Primary Examiner* — Mark Blouin
(74) *Attorney, Agent, or Firm* — Zilka-Kotab, PC

(57) ABSTRACT

In one embodiment, a magnetic head includes a lower shield, a magnetoresistive (MR) film positioned above the lower shield, the MR film including a pinned layer, an intermediate layer positioned above the pinned layer, and a free layer positioned above the intermediate layer, the free layer being configured for sensing data on a magnetic medium, wherein a track width of the MR film is defined by a width of the free layer in a cross-track direction, a bias layer positioned on both sides of the MR film in the cross-track direction, a track insulating film positioned on both sides of the MR film in the cross-track direction and between the MR film and the bias layer, and an upper shield positioned above the bias layer and the MR film, wherein a length of the free layer in an element height direction perpendicular to an air bearing surface of the magnetic head is less than a length of the pinned layer in the element height direction.

21 Claims, 13 Drawing Sheets

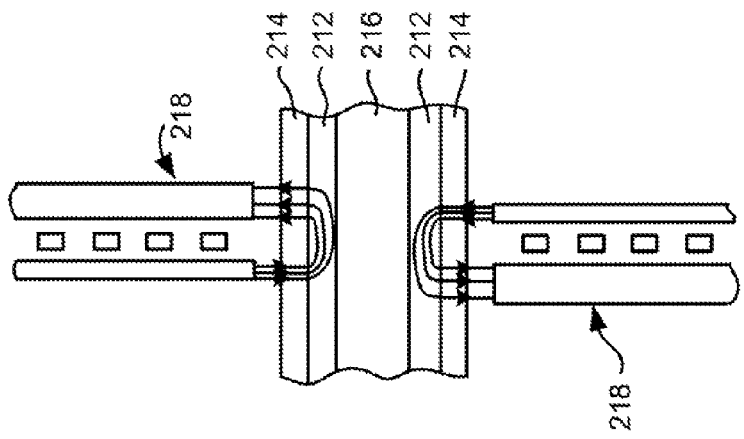
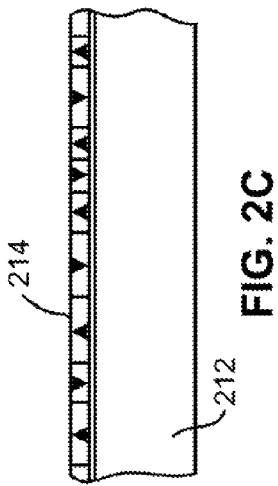
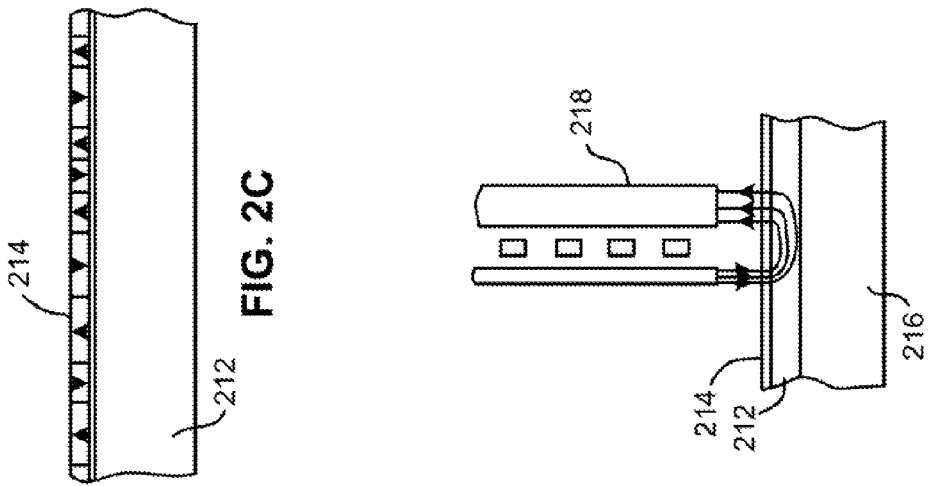
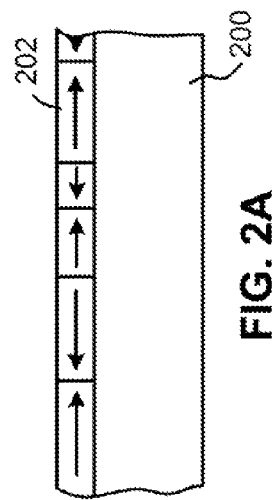
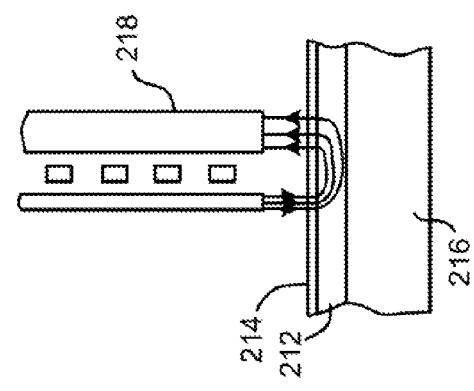
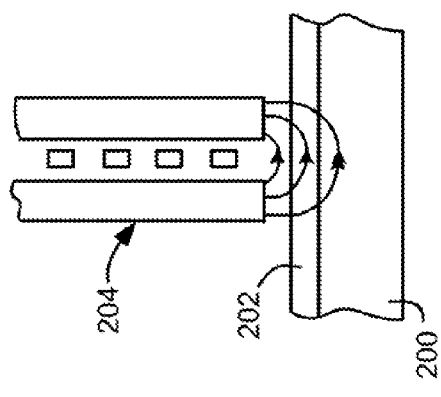

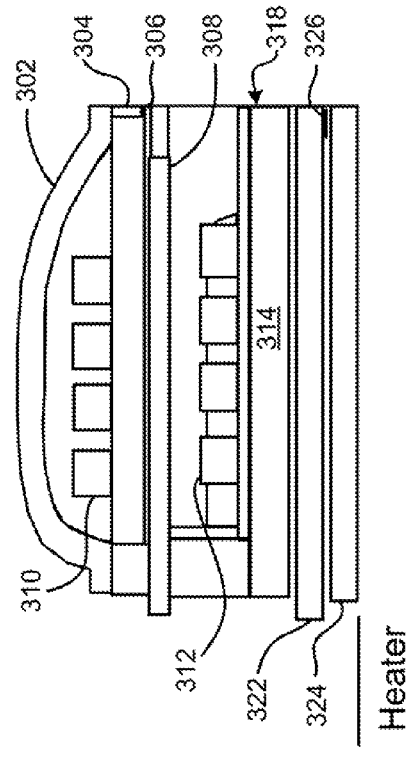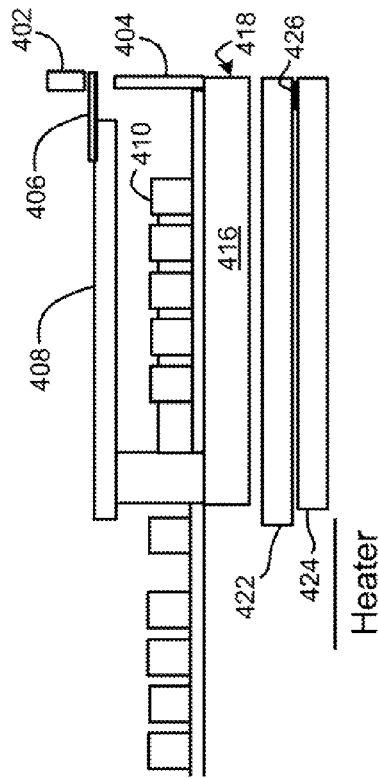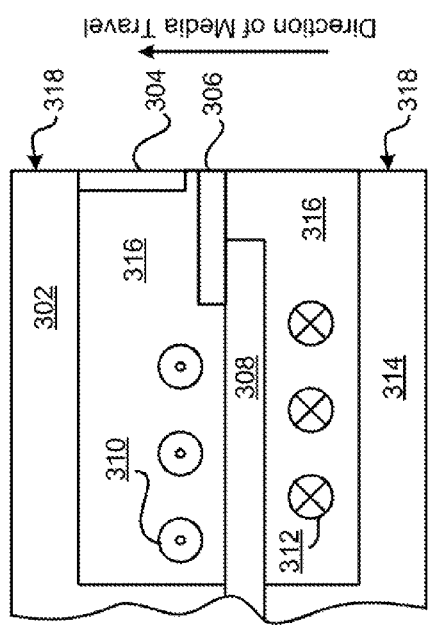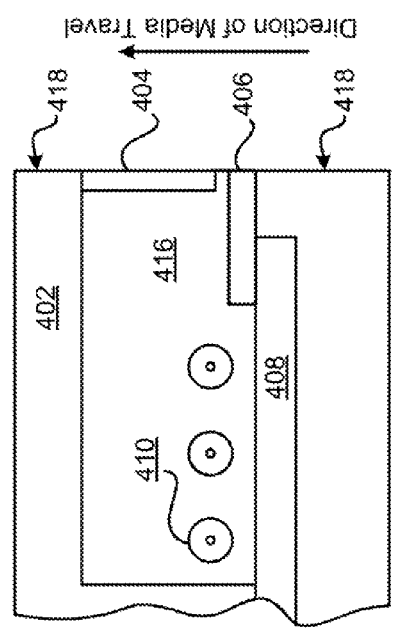

MAGNETIC HEAD HAVING A LONG THROAT HEIGHT PINNED LAYER WITH A SHORT HEIGHT HARD BIAS LAYER

FIELD OF THE INVENTION

The present invention relates to magnetic heads, and more particularly, this invention relates to a magnetic head having a long throat height pinned layer with a short height hard bias layer.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, HDDs have been desired to store more information in its limited area and volume. A technical approach to this desire is to increase the capacity by increasing the recording density of the HDD. To achieve higher recording density, further miniaturization of recording bits is effective, which in turn typically requires the design of smaller and smaller components.

In particular, the dimensions of the recording head in the cross-track direction and in the throat height direction need to be minimized. When this is done, the volume of the pinned layer is reduced and problems arise in regard to performance fluctuation of the read element. In order to avoid this, conventionally performance stability is ensured by providing sufficient volume by extending the pinned layer in the throat-height direction.

Also, processing to form the track width of the read head with very small size and high accuracy is employed prior to forming the throat height. The reason for this is that performing fine patterning when there is little difference in surface level is advantageous in regard to increasing fineness and precision in the photolithographic step and other subsequent steps.

The following problems arise when a read head is manufactured with a pinned layer that is extended in the throat height direction combined with the conventional technique of forming the track width of the read head beforehand. In the track width direction of the read element, a film referred to as a hard bias layer that is used for stabilizing the magnetic characteristic of the read element is typically provided. This hard bias layer remains behind the read element and has the same cross-sectional structure as the pinned layer. In these circumstances, two chief problems arise.

The first problem is that, since the hard bias layer has the same cross-sectional structure as the pinned layer, and the hard bias layer is longer in the throat height direction than in other typical structures, the shape anisotropy effect is lowered, resulting in a degradation in the ability to withstand external magnetic fields. The second problem is that the rear portion of this hard bias layer that is left behind the read element actually applies a biasing magnetic field to the pinned layer, which has an adverse effect on this pinned layer.

SUMMARY

In one embodiment, a magnetic head includes a lower shield, a magnetoresistive (MR) film positioned above the lower shield, the MR film including a pinned layer, an intermediate layer positioned above the pinned layer, and a free layer positioned above the intermediate layer, the free layer being configured for sensing data on a magnetic medium, wherein a track width of the MR film is defined by a width of the free layer in a cross-track direction, a bias layer positioned on both sides of the MR film in the cross-track direction, a track insulating film positioned on both sides of the MR film in the cross-track direction and between the MR film and the bias layer, and an upper shield positioned above the bias layer and the MR film, wherein a length of the free layer in an element height direction perpendicular to an air bearing surface of the magnetic head is less than a length of the pinned layer in the element height direction.

In another embodiment, a magnetic head includes a lower shield, a MR film positioned above the lower shield, the MR film including a pinned layer, an intermediate layer positioned above the pinned layer, and a free layer positioned above the intermediate layer, the free layer being configured for sensing data on a magnetic medium, wherein a track width of the MR film is defined by a width of the free layer in a cross-track direction, a bias layer positioned on both sides of the MR film in the cross-track direction, a track insulating film positioned on both sides of the MR film in the cross-track direction and between the MR film and the bias layer, and an upper shield positioned above the bias layer and MR film, wherein a length of the bias layer in an element height direction perpendicular to an air bearing surface of the magnetic head is about equal to a length of the free layer in the element height direction.

In yet another embodiment, a method for forming a magnetic head includes forming a lower shield, forming a MR film above the lower shield, the MR film including an underlayer film formed above the lower shield, a pinned layer formed above the underlayer film, an intermediate layer formed above the pinned layer, a free layer configured for sensing data on a magnetic medium formed above the intermediate layer, wherein a track width of the MR film is defined by a width of the free layer in a cross-track direction, and a cap film formed above the free layer, forming a track insulating film on both sides of the MR film in the cross-track direction, forming a bias layer adjacent the track insulating film on both sides of the MR film in the cross-track direction, and forming an upper shield above the bias layer and MR film, wherein the bias layer is formed such that at least one of: a length of the bias layer in an element height direction perpendicular to an air bearing surface of the magnetic head is about equal to a length of the free layer in the element height direction, and the length of the free layer in the element height direction is less than a length of the pinned layer in the element height direction.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2E is a schematic representation of a recording apparatus adapted for recording separately on both sides of the medium.

FIG. 3A is a cross-sectional view of one particular embodiment of a perpendicular magnetic head with helical coils.

FIG. 3B is a cross-sectional view of one particular embodiment of a piggyback magnetic head with helical coils.

FIG. 4A is a cross-sectional view of one particular embodiment of a perpendicular magnetic head with looped coils.

FIG. 4B is a cross-sectional view of one particular embodiment of a piggyback magnetic head with looped coils.

DETAILED DESCRIPTION

Figure 1:
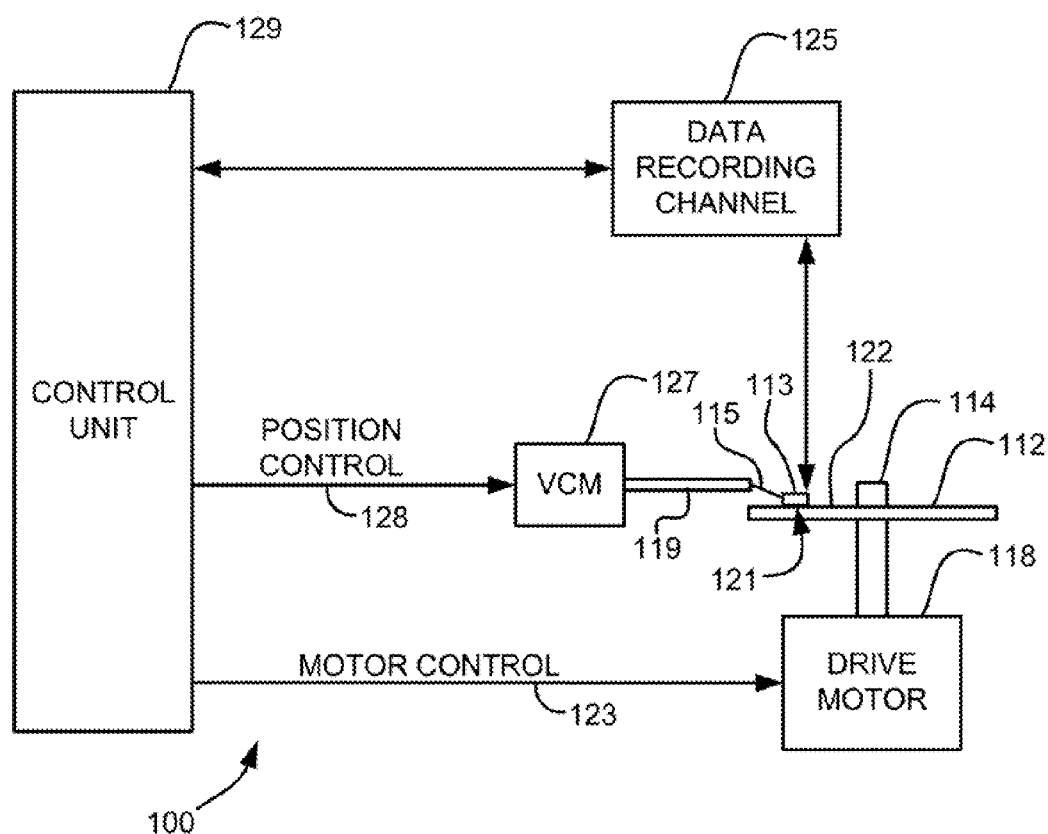
FIG. 1 is a simplified drawing of a magnetic recording disk drive system.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one general embodiment, a magnetic head includes a lower shield, a magnetoresistive (MR) film positioned above the lower shield, the MR film including a pinned layer, an intermediate layer positioned above the pinned layer, and a free layer positioned above the intermediate layer, the free layer being configured for sensing data on a magnetic medium, wherein a track width of the MR film is defined by a width of the free layer in a cross-track direction, a bias layer positioned on both sides of the MR film in the cross-track direction, a track insulating film positioned on both sides of the MR film in the cross-track direction and between the MR film and the bias layer, and an upper shield positioned above the bias layer and the MR film, wherein a length of the free layer in an element height direction perpendicular to an air bearing surface of the magnetic head is less than a length of the pinned layer in the element height direction.

In another general embodiment, a magnetic head includes a lower shield, a MR film positioned above the lower shield, the MR film including a pinned layer, an intermediate layer positioned above the pinned layer, and a free layer positioned above the intermediate layer, the free layer being configured for sensing data on a magnetic being medium, wherein a track width of the MR film is defined by a width of the free layer in a cross-track direction, a bias layer positioned on both sides of the MR film in the cross-track direction, a track insulating film positioned on both sides of the MR film in the cross-track direction and between the MR film and the bias layer, and an upper shield positioned above the bias layer and MR film, wherein a length of the bias layer in an element height direction perpendicular to an air bearing surface of the magnetic head is about equal to a length of the free layer in the element height direction.

In yet another general embodiment, a method for forming a magnetic head includes forming a lower shield, forming a MR film above the lower shield, the MR film including an underlayer film formed above the lower shield, a pinned layer formed above the underlayer film, an intermediate layer formed above the pinned layer, a free layer configured for sensing data on a magnetic medium formed above the intermediate layer, wherein a track width of the MR film is defined by a width of the free layer in a cross-track direction, and a cap film formed above the free layer, forming a track insulating film on both sides of the MR film in the cross-track direction, forming a bias layer adjacent the track insulating film on both sides of the MR film in the cross-track direction, and forming an upper shield above the bias layer and MR film, wherein the bias layer is formed such that at least one of a length of the bias layer in an element height direction perpendicular to an air bearing surface of the magnetic head is about equal to a length of the free layer in the element height direction, and the length of the free layer in the element height direction is less than a length of the pinned layer in the element height direction.

Referring now to FIG. 1, there is shown a disk drive 100 in accordance with one embodiment of the present invention. As shown in FIG. 1, at least one rotatable magnetic disk 112 is supported on a spindle 114 and rotated by a drive mechanism, which may include a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Now that in some embodiments, the slider 113 may slide along the disk surface 122.

The various components of the disk storage system are controlled in operation by control signals generated by controller 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, tailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown near the non-ABS side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

According to embodiment, a thin-film magnetic head may comprise a lower shield, a current-perpendicular-to-plane (CPP) read element positioned above the lower shield, a hard bias layer or soft bias layer that applies a biasing magnetic field to the read element positioned in a track width direction from the read element, and an upper shield positioned above the read element. The CPP read element comprises a free layer, an intermediate layer positioned below the free layer, and a pinned layer positioned below the intermediate layer. Furthermore, the hard bias layer or soft bias layer are configured to apply a biasing magnetic field to the free layer, and has a length in the throat height direction that is reduced to about a length of the free layer in the throat height direction (e.g., the hard or soft bias layer is reduced in length by about 10 nm to about 100 nm as compared to conventional bias layers). In addition, a length of the pinned layer in the throat height direction is in a range from about 200 nm to about 5000 nm, such as between about 500 nm and about 2000 nm.

Since the hard bias layer (or soft bias layer) that applies the biasing magnetic field to the free layer may be reduced in length to about the length of the free layer in the throat height direction, the ability to withstand external magnetic fields is improved compared with conventionally formed heads. Consequently, the biasing magnetic field is stabilized compared with conventional heads, and stabilization of the head performance may be achieved.

Furthermore, the effect of the magnetic field from the hard bias layer (or soft bias layer) on the pinned layer may be reduced compared with conventionally formed heads. This makes it possible to reduce the noise from the pinned layer, improving head performance and stability. Also, since the magnetic head is formed in the track width direction before being formed in the throat height direction, any effect on other processes from the track width formation may be reduced, which is advantageous for a head with a narrow track width.

In summation, since a volume of the pinned layer is increased by extending a length of the pinned layer further than a length of the free layer in the throat height direction, thermal stability of the pinned layer is improved. Also, the formation of the pinned layer which extends in the throat height direction is beneficial in terms of shape anisotropy, so the magnetic performance of the pinned layer is also stabilized.

Figure 5A:
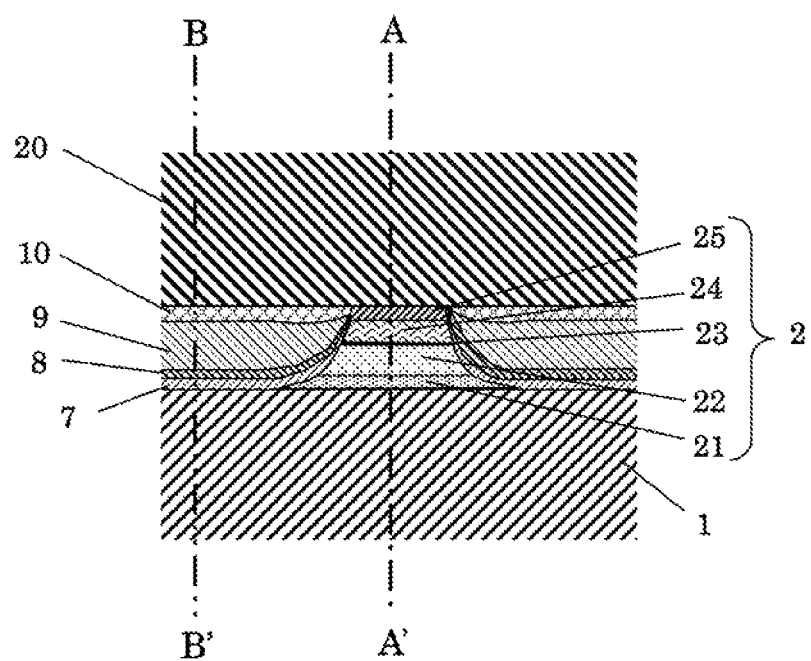
FIG. 5A shows a thin film magnetic head according to one embodiment as seen from the air bearing surface (ABS) thereof.

FIG. 5A shows a thin film magnetic head as seen from the ABS according to one embodiment. A MR film, such as a tunneling magnetoresistive (TMR) film 2, is arranged above a lower shield 1. This TMR film 2 is designed to a desired dimensional width. It should be noted that the TMR film 2 may be a multilayer film and, as an example may comprise, from the lower shield side, an underlayer film 21, a pinned layer 22, a barrier film (intermediate layer) 23, a free layer 24, and a cap film 25. The read track width is defined by the free layer width. Consequently, the width of the TMR film 2 is made narrow. In order to precisely form this narrow free layer track width, on both sides of the TMR film 2, there is a track insulating film 7 and bias underlayer film 8, a bias layer (bias application layer) 9, and a bias cap film 10. The upper shield film 20 is arranged above these layers.

Figures 5B, 5C:
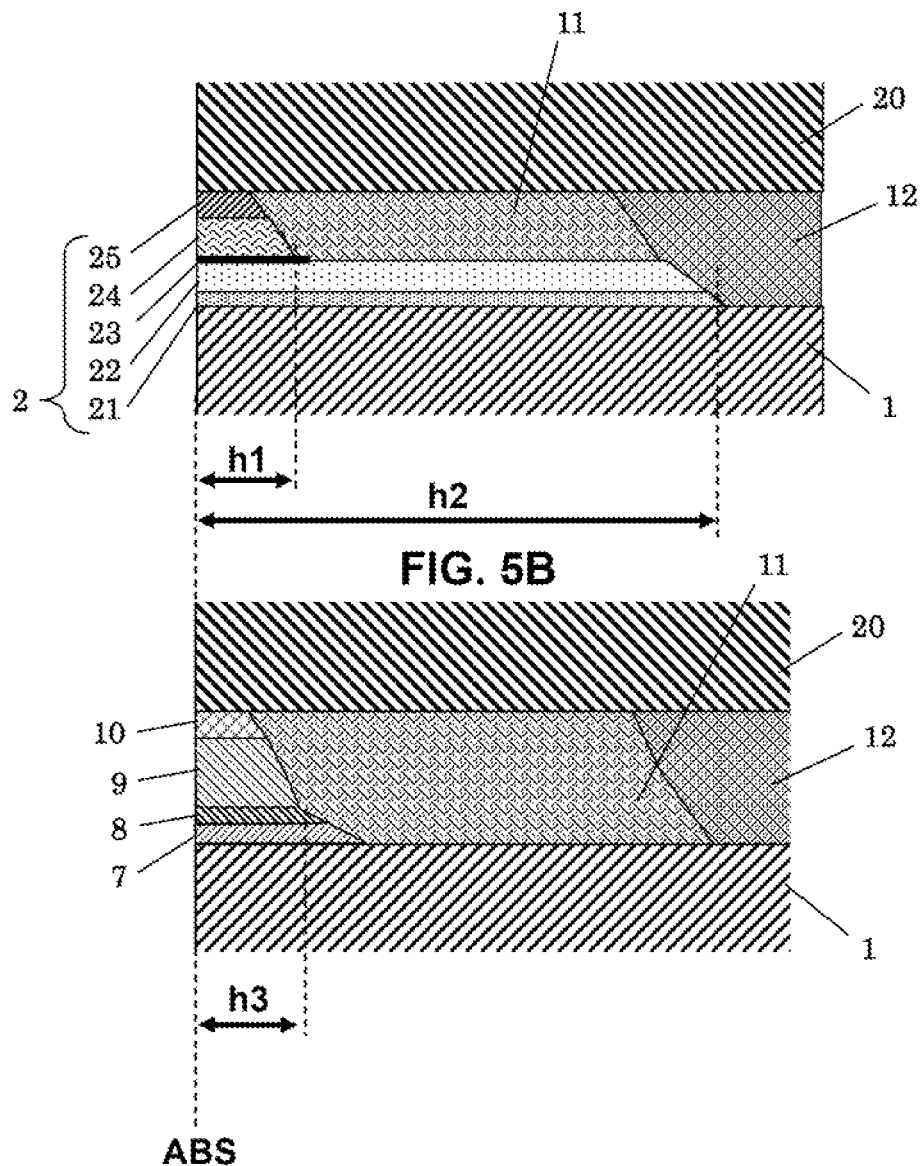
FIG. 5B shows a cross-sectional view of the thin film magnetic head as shown in FIG. 5A, according to one embodiment.
FIG. 5C shows a cross-sectional view of the thin film magnetic head as shown in FIG. 5A, according to one embodiment.

FIG. 5B shows the A-A' cross-sectional view of the thin film magnetic head in FIG. 5A from the ABS face towards the head throat, in the vicinity of the middle of the TMR film 2 according to one embodiment. The length from the ABS to the free layer 24 in the TMR film 2 is h1 and the length from the ABS as far as the end of the pinned layer 22 and in the vicinity of the end of the underlayer film 21 is h2. The relationship between the lengths h1 and h2 in one embodiment may be h1<h2. In addition, h1 may be several tens of nanometers and h2 may be several hundred nanometers to several thousand nanometers. For example, h1 may be between about 15 nm and about 100 nm, while h2 may be between about 500 nm and about 2000 nm.

FIG. 5C is the B-B' cross-sectional view of FIG. 5A in the head throat direction from the ABS face on the bias layer side. h3 is the length from the ABS as far as the vicinity of the end of the bias layer 9. The lengths of h1 and h3 may be substantially the same, plus or minus about 10%, according to one embodiment. For example, h1 and/or h3 may be between about 15 nm and about 100 nm.

In addition, to improve head performance, the track width and the aforementioned length h1 may be reduced. The reason for this is that, in order to detect minute magnetic fields, it is necessary to reduce this h1. On the other hand, if the length of h2 is reduced as far as to be of the same order as h1, the volume of the pinned layer 22 is reduced, and stability is lowered due to effects, such as temperature volatility. As a result, performance is degraded. In order to prevent this, in this head construction, h2 is extended to the extent of several hundred nanometers to several thousand nanometers. By doing this, performance of the pinned layer 22 may be stabilized, due to the beneficial effects of increase in volume and shape anisotropy. Stabilized head performance may thereby be achieved.

Figures 6A, 6B:
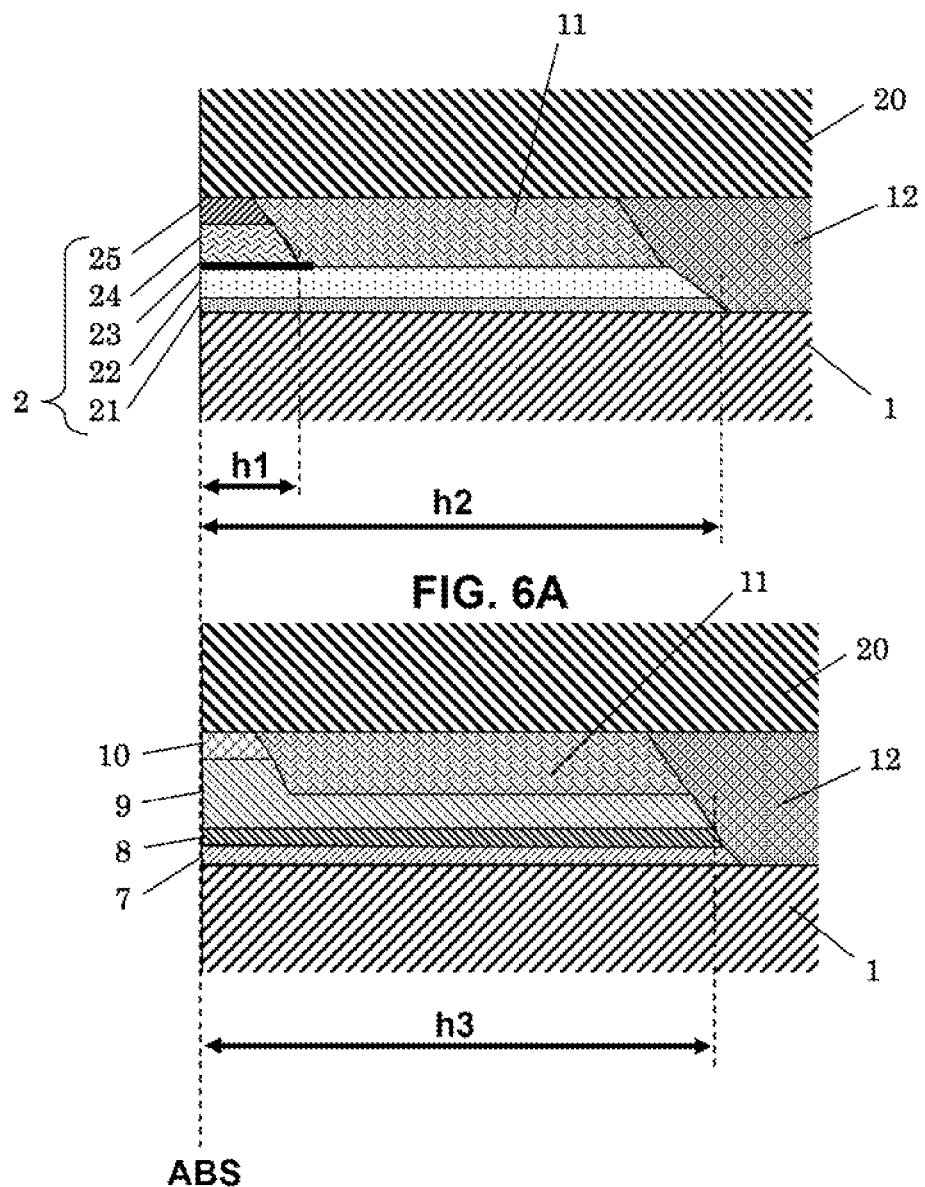
FIG. 6A shows a cross-sectional view of a thin film magnetic head, according to the prior art.
FIG. 6B shows another cross-sectional view of a thin film magnetic head, according to the prior art.

FIG. 6A shows a A-A' cross-sectional view of a thin film magnetic head, according to the prior art. FIG. 6A has substantially the same cross-sectional structure as FIG. 5B; however, FIG. 6B, which is along B-B' is considerably different from FIG. 5C. In this regard, the length relationship of the structural elements differs in present embodiments.

As shown in FIGS. 6A-6B, the length from the ABS in the TMR film 2 to the free layer 24 is defined as h1, the length from the ABS to the end of the pinned layer 22 and the vicinity of the end of the underlayer film 21 is defined as h2, and the length from the ABS to the vicinity of the end of the biasing film 9 is defined as h3. The relationship of the lengths h1 and h2 is similar in that h1<h2, but the length of h3 differs considerably in that it has substantially the same length as h2, plus or minus about 10%.

A more specific description of the differences in regard to performance and benefits between the construction of the present embodiments and the prior art construction are described with reference to FIGS. 7, 8A, and 8B.

Figure 7:
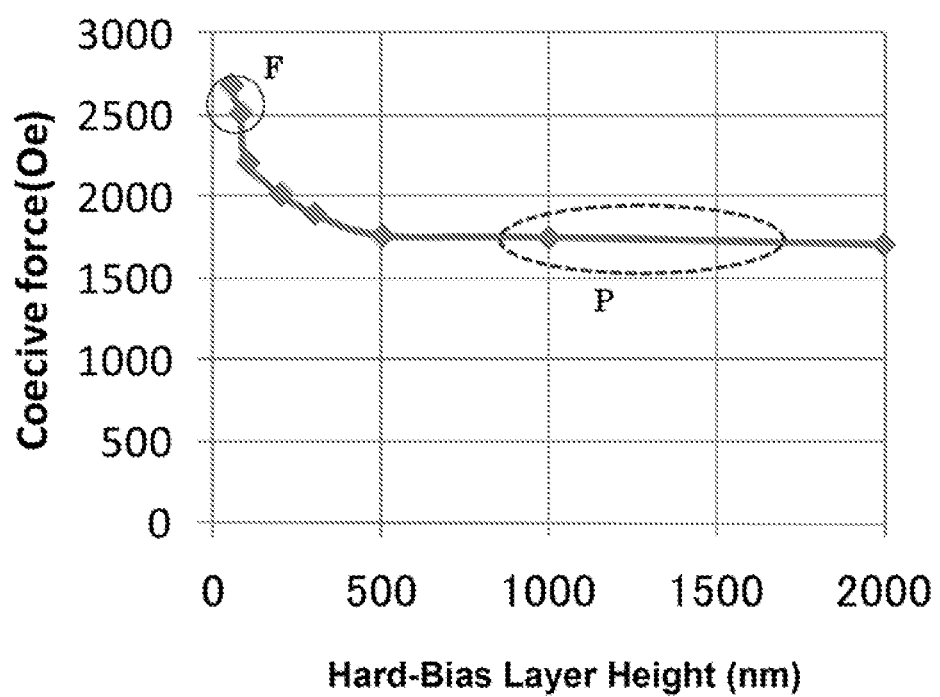
FIG. 7 shows a relationship between the length from the ABS of the hard bias layer (hard bias layer height) and the coercive force of the hard bias layer.

FIG. 7 shows the results of calculation showing the relationship between the length (hard bias layer height) from the ABS face in the hard bias layer that applies a biasing magnetic field to the free layer and the coercive force of the hard bias layer. When the hard bias layer height is in the region (F-area) of several tens of nanometers, the coercive force is about 2500 to 2700 (Oe). On the other hand, in the case of the region (P-area) where the hard bias height is 500 nm or more, up to several thousand nanometers, the coercive force is lowered to about 1700 (Oe). Increased coercive force implies higher stability with respect to external magnetic fields, which means that the case of the region (F-area) where the hard bias layer height is several tens of nanometers is superior in that stability in terms of head performance is higher. With the construction of the thin film magnetic head as shown in FIGS. 5A-5C, since the hard bias layer height is several tens of nanometers, a head structure may be provided whereby excellent stability of the hard bias layer described above in regard to external magnetic fields is achieved.

In contrast, with the prior art head structure of FIGS. 6A-6B, the hard bias layer height is of the order of several thousand nanometers, so the ability of the hard bias layer to withstand external magnetic fields is lowered, resulting in degraded stability of the head performance.

Figure 8A:
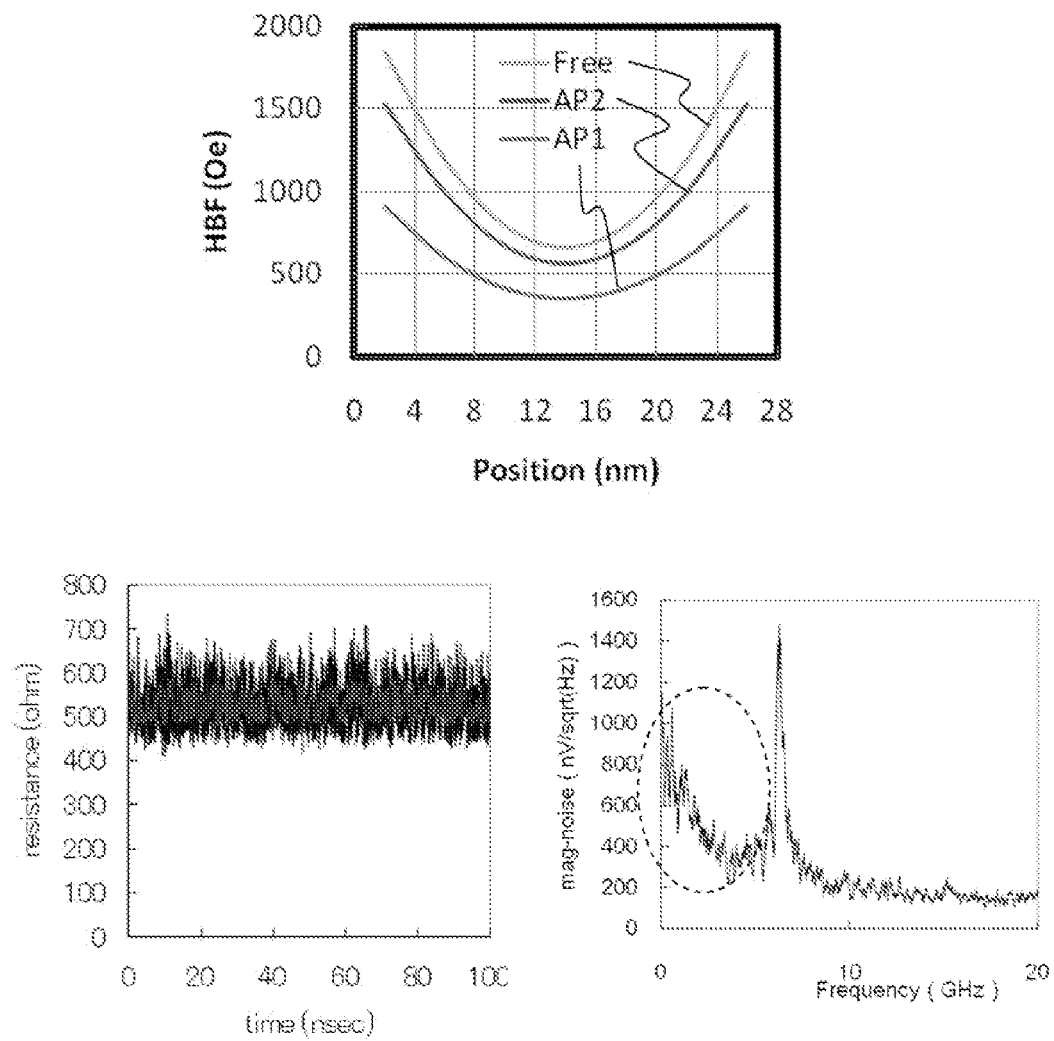
FIG. 8A shows various characteristics of a thin film magnetic head construction according to the prior art.

FIG. 8A shows the results of calculation of performance when a head having a conventional structure as shown in FIGS. 6A-6B is employed. FIG. 8A shows the relationship between the magnitude of the biasing magnetic field (hard bias field: HBF) from the hard bias layer, and locations in the track width direction in the free layer and in the pinned layer (AP1, AP2). The track width is 25 nm. The reason why the HBF is large at both ends of the X axis (track ends) is that the HBF depends on the distance with respect to the hard bias layer and therefore has the relationship that the HBF becomes progressively larger as the distance to the hard bias layer becomes less.

In the case of a conventional thin film magnetic head as shown in FIGS. 6A-6B, the hard bias layer is arranged at both ends on the pinned layer side, not merely on the free layer side, so a biasing magnetic field is applied thereto. Consequently, as shown in the upper chart of FIG. 8A, the HBF of the pinned layer (AP1, AP2) is applied to a larger extent of the free layer than any other layer. It is surmised that, since the direction of magnetization of the pinned layer is in the forward direction of the biasing magnetic field HBF, when the HBF is applied, there is an adverse effect in that the direction of magnetization of the pinned layer becomes inclined in the hard bias direction.

The chart on the left of FIG. 8A shows the fluctuation with passage of time of the head resistance in the head described with reference to FIGS. 6A-6B. With passage of time, the head resistance fluctuates randomly by an amount of about 400 to 700 Ω. Also, the chart on the right of FIG. 8A shows the magnitude of the head noise at various frequencies. 1/f noise behavior is seen in the low-frequency region indicated by the broken line. Regarding the causes of the resistance fluctuation as shown in the chart on the left of FIG. 8A and the increased noise behavior as shown in the chart on the right of FIG. 8A, the largest cause is that the direction of magnetization of the pinned layer shown in the upper chart of FIG. 8A is affected by the magnetic field from the hard bias layer and so becomes unstable.

Figure 8B:
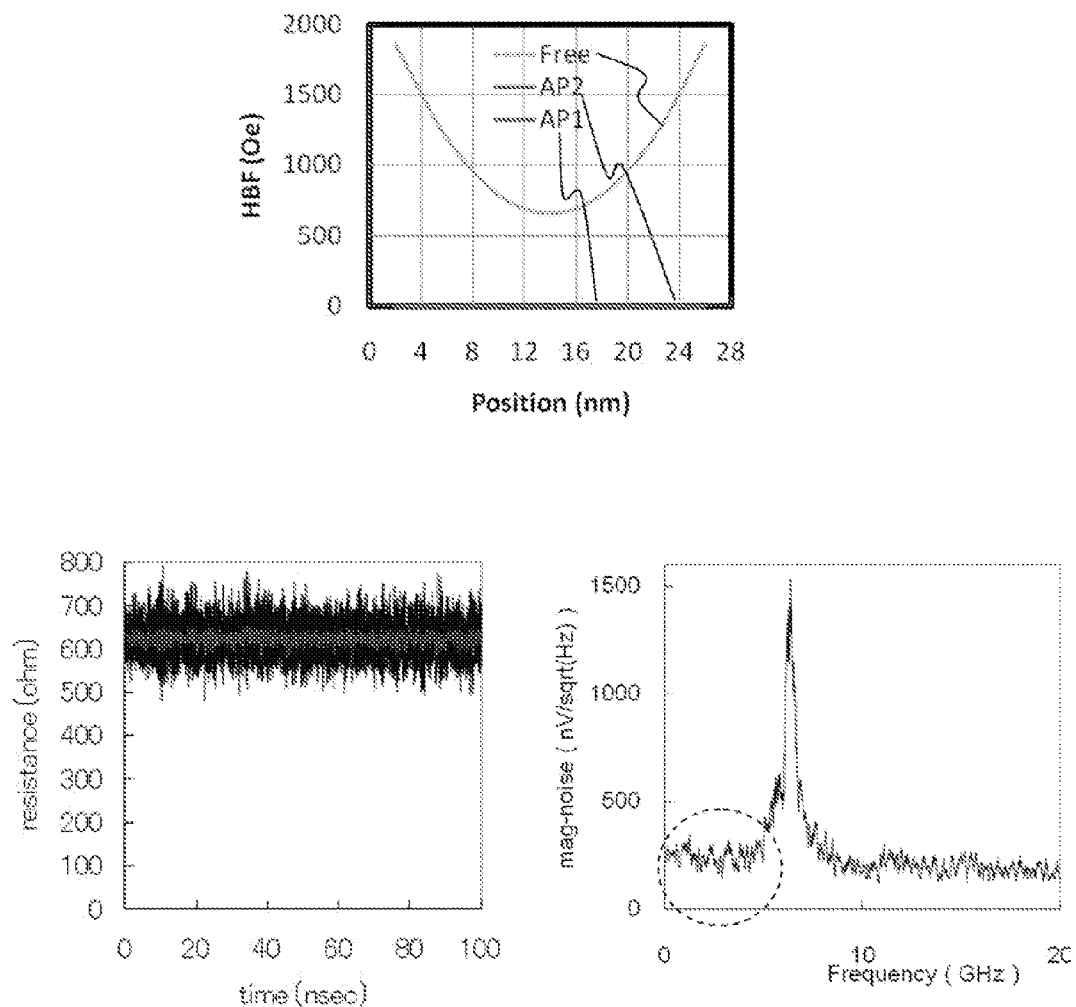
FIG. 8B shows various characteristics of a thin film magnetic head construction according to one embodiment.

FIG. 8B shows an example of the results of calculation of the performance in the case of the construction according to a present embodiment as shown in FIGS. 5A-5C. As shown in FIGS. 5A-5C described above, the hard bias height of the hard bias layer is several tens of nanometers, so the effect on the pinned layer at the rear of the element may be greatly reduced compared with the prior art construction. Furthermore, by adjusting the film thickness of the hard bias layer or the bias underlayer film, the effect on the pinned layer may be further reduced. The calculation results as shown in the upper chart of FIG. 8B are results found for the case where the effect of HBF on the pinned layer is substantially eliminated. According to one embodiment, it becomes possible to obtain a biasing magnetic field distribution as shown in the upper chart of FIG. 8B, by reducing or eliminating the effect of the biasing magnetic field on the pinned layer. Consequently, the random fluctuation of the head resistance as shown in the left chart of FIG. 8B is greatly reduced compared with the left chart of FIG. 8A, i.e. stabilization is achieved. Also, the 1/f noise behavior in the low-frequency region indicated by the broken line in the right chart of FIG. 8B may be greatly reduced compared with the right chart of FIG. 8A. Thus, with the construction of the present embodiment, the influence from the hard bias layer to the pinned layer may be reduced and in this way, improved stability and noise reduction may be achieved, i.e. head performance improvement and stability improvement are obtained.

An example of a method of manufacture according to one embodiment is shown in FIGS. 9A-9H. FIGS. 9A-9H are diagrams seen from the element surface of part of the various steps.

Figure 9A:
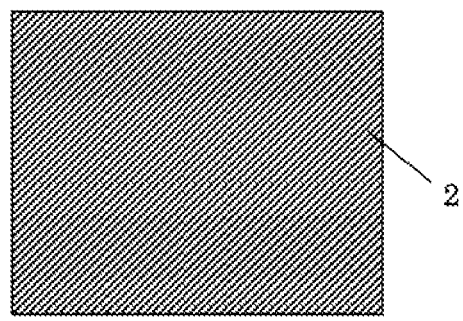
FIG. 9A-9H show various steps of a formation process for a thin film magnetic head according to one embodiment.
Figure 9B:
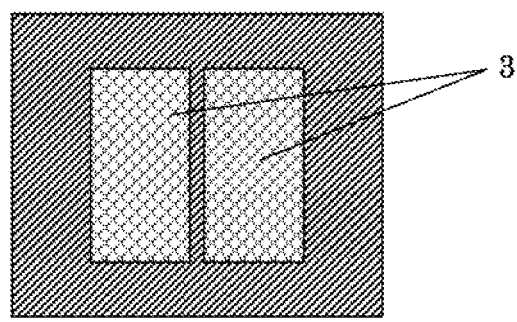
Figure 9C:
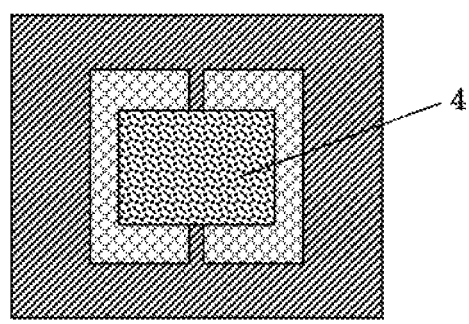

FIG. 9A shows the formation of a TMR film 2 on the lower shield 1. FIG. 9B shows termination of defining of the track width. The track insulating film (not shown) and/or hard bias layer 3 are formed by etching a region consisting of part of the TMR film 2. The width of the central portion in the transverse direction in FIG. 9B is that in the track width direction of the TMR film 2. FIG. 9C is a view of the formation of a throat-height resist pattern 4 to define the length direction from the ABS of the element.

Figure 9D:
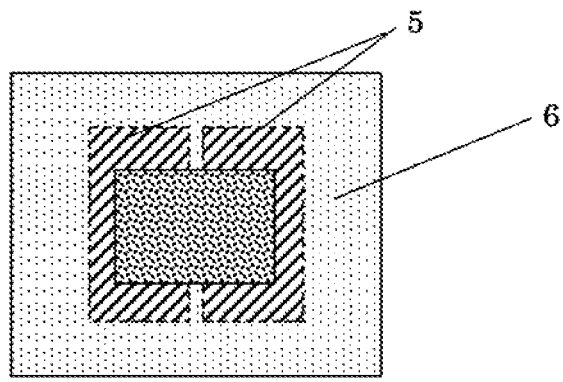

FIG. 9D shows etching the TMR film 2 at least as far as the bottom of the free layer in the TMR film 2, using the throat-height resist pattern 4 as an etching mask. Etching is performed as far as the surface of the pinned layer 6 in the TMR film 2 in one approach. In this process, the track width is defined as shown in FIG. 9B and a functional layer that generates a biasing magnetic field of at least the hard bias layer is etched in the region where the hard bias layer is positioned. Thus etching is performed as far as the vicinity of the lower shield 5 in one approach. In this way, a construction as shown in FIGS. 5A-5C may be finally obtained. A more specific description for obtaining a construction in which the hard bias layer region is etched substantially as far as the bottom thereof and the TMR film region is etched to some point therein is given below.

In order to obtain a construction as described above, a difference in etching times of the TMR film region and the hard bias layer region is used. According to some present embodiments, this may be achieved by: 1) forming the cap layer at the top of the TMR film that is suitably thick for etching; or 2) adopting a multilayer structure for the cap layer, in which a material of low etching rate is provided. In the case where milling or the like is employed as an etching process, it is effective to employ alumina, Ta, diamond-like carbon (DLC), Ir, or the like in a cap film multilayer structure. If reactive ion etching (RIE) or the like is employed as the etching process, it is effective to employ alumina, Ta, Cr, NiFe, or the like in a cap film multilayer structure. In this way, an etching difference is produced between the TMR film region and the hard bias layer region, making it possible to obtain a construction in which etching of the TMR film region is performed to some point thereof (but not all the way through), whereas etching of the hard bias layer region is performed substantially to the lower extent thereof.

Figure 9E:
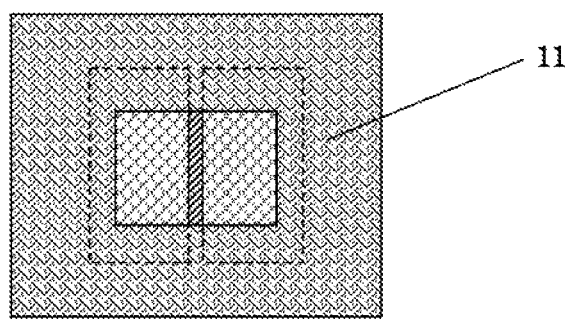
Figure 9F:
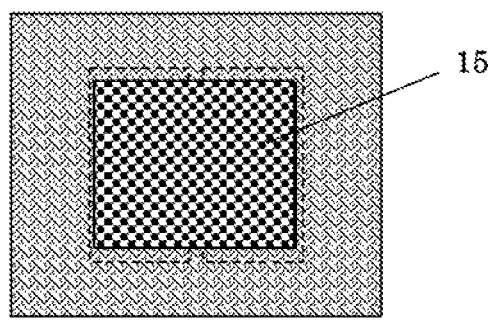
Figure 9G:
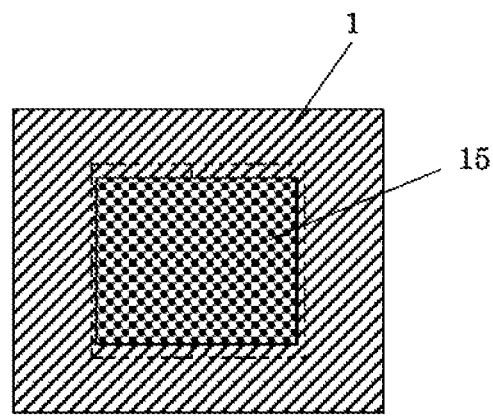

FIG. 9E is a view after liftoff wherein a throat-height of a first insulating film 11 is formed. FIG. 9F is a view after formation of an element isolation resist pattern 15. FIG. 9G is a view after etching as far as the lower shield 1, using the element isolating resist pattern 15 as an etching mask. The lower shield 1 may be over-etched, in order to secure a margin in regard to element isolation.

Figure 9H:
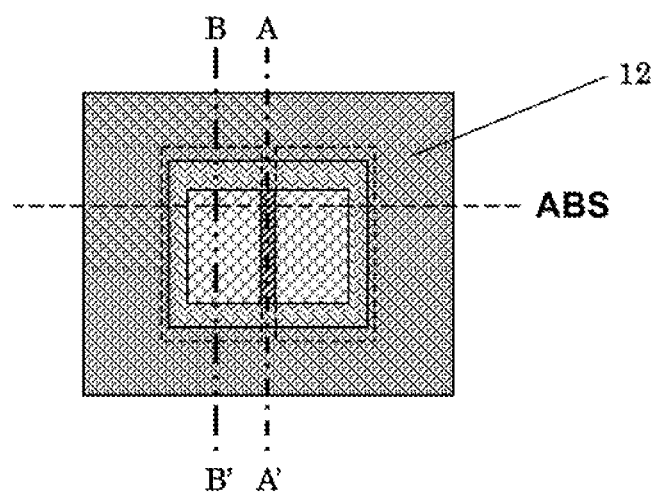

FIG. 9H is a view after liftoff wherein a throat-height second insulating film 12 is formed. The broken line in the transverse direction indicates the assumed ABS position that will constitute the final ABS.

Figure 10A:
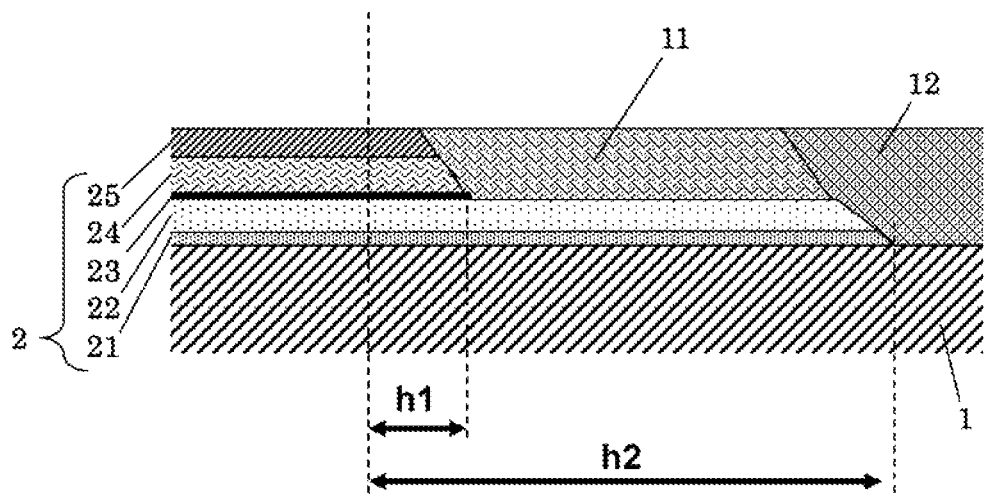
FIGS. 10A-10B show cross-sectional views of the thin film magnetic head as shown in FIG. 9H, according to one embodiment.

FIG. 10A is a view showing the cross-sectional view of a magnetic head according to one embodiment, taken from line A-A' in FIG. 9H in the vicinity of the middle of the TMR film 2. The length from the assumed ABS to the end of the free layer 24 in the TMR film 2 is h1 and the length from the vicinity of the assumed ABS to the end of the pinned layer 22 in the vicinity of the end of the underlayer film 21 is h2. Just as in the case illustrated previously, h1<h2, and the length of h1 is a few tens of nanometers while the length of h2 is a few hundred nanometers to a few thousand nanometers.

Figure 10B:
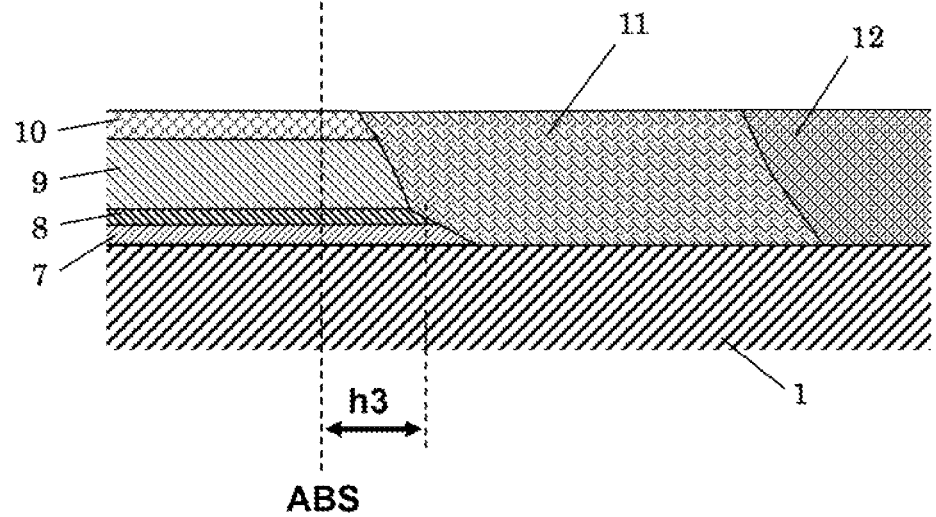

FIG. 10B is a cross-sectional view from the vicinity of the assumed ABS on the bias layer side towards the head throat of the B-B' line from FIG. 9H. The length from the vicinity of the assumed ABS to the vicinity of the end of the bias layer 9 is defined as h3. The lengths of h1 and h3 are substantially the same or equal, plus or minus 10%, as previously described.

The upper shield 20 is formed above the structure shown in FIG. 9H, whereupon the head structure as previously described in FIGS. 5A-5C is obtained.

While a head construction and method of manufacture thereof according to present embodiments have been described above, various modifications may be made as would be understood by one of skill in the art. For example, although the description was given for the case where a hard bias layer is employed as the method of applying a biasing magnetic field to the TMR film, it would also be possible to employ a soft biasing film using a soft magnetic layer as the method for applying bias. In this case also, the h1<h2 and h1 is substantially the same as h3. Any suitable hard or soft magnetic biasing materials as known in the art may be used.

Also while the use of a TMR film as a sensor film has been described, and may be used in a CPP type read head, the present embodiments may be applied by employing a CPP type sensor film as well.

A method of manufacturing a thin-film magnetic head according to one embodiment is characterized in that material of high etching selection ratio is arranged on the side of the sensor film surface (cap layer), or the film thickness of the cap layer is increased. After this, first of all, a step of machining the sensor film to the track width and forming a hard bias film or soft bias film is performed. After this, a step is performed of forming the sensor film in the throat-height direction. At this point, by arranging a material of high etching selection ratio on the sensor film surface, or increasing the film thickness of the cap layer, etching of the sensor film is performed at least as far as the free layer, and at least a bias application layer of the hard bias film (soft bias film) is entirely etched.

In some approaches, a thin film magnetic head as shown in FIGS. 5A-5C may be used in a magnetic data storage system. The magnetic data storage system may be similar to that shown in FIG. 1. For example, the magnetic data storage system 100 may comprise at least one magnetic head 121 as described according to an embodiment herein, a magnetic medium 112, a drive mechanism 118 for passing the magnetic medium 112 over the at least one magnetic head 121, and a controller 129 electrically coupled to the at least one magnetic head 121 for controlling operation of the at least one magnetic head 121.

It should be noted that methodology presented herein for at least some of the various embodiments may be implemented, in whole or in part, in computer hardware, software, by hand, using specialty equipment, etc. and combinations thereof.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic head, comprising:
   a lower shield;
   a magnetoresistive (MR) film positioned above the lower shield, the MR film comprising a pinned layer, an intermediate layer positioned above the pinned layer, and a free layer positioned above the intermediate layer, the free layer being configured for sensing data on a magnetic medium, wherein a track width of the MR film is defined by a width of the free layer in a cross-track direction;
   a bias layer positioned on both sides of the MR film in the cross-track direction;
   a track insulating film positioned on both sides of the MR film in the cross-track direction and between the MR film and the bias layer; and
   an upper shield positioned above the bias layer and the MR film,
   wherein a length of the free layer in an element height direction perpendicular to an air bearing surface of the magnetic head is less than a length of the pinned layer in the element height direction.

2. The magnetic head as recited in claim 1, wherein a length of the bias layer in the element height direction is about equal to the length of the free layer in the element height direction.

3. The magnetic head as recited in claim 2, wherein the length of the bias layer in the element height direction is between about 15 nm and about 100 nm.

4. The magnetic head as recited in claim 1, further comprising:
   a bias underlayer film positioned above the track insulating film and below the bias layer on both sides of the MR film in the cross-track direction; and
   a bias cap film positioned above the bias layer on both sides of the MR film in the cross-track direction.

5. The magnetic head as recited in claim 1, wherein the bias layer comprises a hard bias film.

6. The magnetic head as recited in claim 1, wherein the bias layer comprises a soft bias film.

7. The magnetic head as recited in claim 1, wherein the MR film further comprises:
an underlayer film positioned above the lower shield and below the pinned layer; and
a cap film positioned above the free layer.

8. A magnetic data storage system, comprising:
at least one magnetic head as recited in claim 1;
the magnetic medium;
a drive mechanism for passing the magnetic medium over the at least one magnetic head; and
a controller electrically coupled to the at least one magnetic head for controlling operation of the at least one magnetic head.

9. A magnetic head, comprising:
a lower shield;
a magnetoresistive (MR) film positioned above the lower shield, the MR film comprising a pinned layer, an intermediate layer positioned above the pinned layer, and a free layer positioned above the intermediate layer, the free layer being configured for sensing data on a magnetic medium, wherein a track width of the MR film is defined by a width of the free layer in a cross-track direction;
a bias layer positioned on both sides of the MR film in the cross-track direction;
a track insulating film positioned on both sides of the MR film in the cross-track direction and between the MR film and the bias layer; and
an upper shield positioned above the bias layer and MR film,
wherein a length of the bias layer in an element height direction perpendicular to an air bearing surface of the magnetic head is about equal to a length of the free layer in the element height direction.

10. The magnetic head as recited in claim 9, wherein the length of the free layer in the element height direction is less than a length of the pinned layer in the element height direction.

11. The magnetic head as recited in claim 10, wherein the length of the pinned layer is between about 500 nm and about 2000 nm and the length of the free layer is between about 15 nm and about 100 nm.

12. The magnetic head as recited in claim 9, further comprising:
a bias underlayer film positioned above the track insulating film and below the bias layer on both sides of the MR film in the cross-track direction; and
a bias cap film positioned above the bias layer on both sides of the MR film in the cross-track direction.

13. The magnetic head as recited in claim 9, wherein the bias layer comprises a hard bias film.

14. The magnetic head as recited in claim 9, wherein the bias layer comprises a soft bias film.

15. The magnetic head as recited in claim 9, wherein the MR film further comprises:

an underlayer film positioned above the lower shield and below the pinned layer; and
a cap film positioned above the free layer.

16. A magnetic data storage system, comprising:
at least one magnetic head as recited in claim 9;
the magnetic medium;
a drive mechanism for passing the magnetic medium over the at least one magnetic head; and
a controller electrically coupled to the at least one magnetic head for controlling operation of the at least one magnetic head.

17. A method for forming a magnetic head, the method comprising:
forming a lower shield;
forming a magnetoresistive (MR) film above the lower shield, the MR film comprising:
an underlayer film formed above the lower shield;
a pinned layer formed above the underlayer film;
an intermediate layer formed above the pinned layer;
a free layer configured for sensing data on a magnetic medium formed above the intermediate layer, wherein a track width of the MR film is defined by a width of the free layer in a cross-track direction; and
a cap film formed above the free layer;
forming a track insulating film on both sides of the MR film in the cross-track direction;
forming a bias layer adjacent the track insulating film on both sides of the MR film in the cross-track direction; and
forming an upper shield above the bias layer and MR film,
wherein the bias layer is formed such that at least one of:
a length of the bias layer in an element height direction perpendicular to an air bearing surface of the magnetic head is about equal to a length of the free layer in the element height direction; and
the length of the free layer in the element height direction is less than a length of the pinned layer in the element height direction.

18. The method as recited in claim 17, wherein the length of the pinned layer is between about 500 nm and about 2000 nm, wherein the length of the free layer is between about 15 nm and about 100 nm, and wherein the bias layer is formed such that the length of the bias layer in the element height direction is about equal to the length of the free layer in the element height direction.

19. The method as recited in claim 17, further comprising:
forming a bias underlayer film above the track insulating film and below the bias layer on both sides of the MR film in the cross-track direction; and
forming a bias cap film above the bias layer on both sides of the MR film in the cross-track direction.

20. The method as recited in claim 17, wherein the bias layer comprises either a hard bias film or a soft bias film.

21. The method as recited in claim 17, wherein the cap film comprises a multilayered film and/or a film structure that is suitably thick to provide a difference in etching times between a MR film region and a bias layer region.

* * * * *

UNITED STATES PATENT AND TRADEMARK OFFICE
CERTIFICATE OF CORRECTION

PATENT NO. : 9,042,060 B2
APPLICATION NO. : 14/037254
DATED : May 26, 2015
INVENTOR(S) : Nobuo Yoshida et al.

Page 1 of 1

It is certified that error appears in the above-identified patent and that said Letters Patent is hereby corrected as shown below:

In the specification:

col. 4, line 36 replace "magnetic being medium," with --magnetic medium,--;

col. 5, line 28 replace "Now" with --Note--;

col. 6, line 65 replace "tailing" with --trailing--;

col. 11, line 59 replace "Also" with --Also,--;

col. 12, line 14 replace "an" with --any--.

Signed and Sealed this
Twentieth Day of October, 2015

Michelle K. Lee
*Director of the United States Patent and Trademark Office*